US010235886B1

(12) United States Patent
Baughman et al.

(10) Patent No.: US 10,235,886 B1
(45) Date of Patent: Mar. 19, 2019

(54) INTEGRAL DAMAGE CONTROL BY INTERACTION BETWEEN A COLLISION DETECTION SYSTEM AND A BUMPER SYSTEM

(71) Applicant: International Business Machines Corporation, Armonk, NY (US)

(72) Inventors: Aaron K. Baughman, Silver Spring, MD (US); Moncef Benboubakeur, Brno (CZ); Gary Diamanti, Wake Forest, NC (US); Christian Eggenberger, Wil (CH); Mauro Marzorati, Lutz, FL (US); Julija Narodicka, Brna (CZ)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/859,998

(22) Filed: Jan. 2, 2018

(51) Int. Cl.
*G08G 1/16* (2006.01)
*B60R 19/18* (2006.01)
*B60W 30/08* (2012.01)
*G06F 17/20* (2006.01)
*G06F 15/18* (2006.01)

(52) U.S. Cl.
CPC ............. *G08G 1/166* (2013.01); *B60R 19/18* (2013.01); *B60W 30/08* (2013.01); *G06F 15/18* (2013.01); *G06F 17/20* (2013.01)

(58) Field of Classification Search
CPC ...................................... G06F 1/00; H04L 1/00
See application file for complete search history.

(56) References Cited

U.S. PATENT DOCUMENTS

| | | | |
|---|---|---|---|
| 3,810,668 A | 5/1974 | Kornhauser | |
| 5,646,613 A | 7/1997 | Cho | |
| 2003/0168869 A1 | 9/2003 | Detwiler et al. | |
| 2005/0087998 A1* | 4/2005 | Curry | B60R 19/205 293/107 |
| 2005/0242596 A1 | 11/2005 | Zanella et al. | |
| 2008/0077328 A1 | 3/2008 | Simmons et al. | |
| 2017/0137023 A1* | 5/2017 | Anderson | B60G 17/0195 |
| 2017/0158175 A1 | 6/2017 | Fairfield | |
| 2017/0161386 A1* | 6/2017 | Mitsui | G06F 17/30867 |

(Continued)

FOREIGN PATENT DOCUMENTS

| | | |
|---|---|---|
| CA | 2725057 A1 | 6/2012 |
| GB | 2527926 A1 | 1/2016 |

OTHER PUBLICATIONS

"Buffers and Chain coupler", Wikipedia, accessed Oct. 20, 2017, 6 pages. https://en.wikipedia.org/wiki/Buffers_and_chain_coupler#Buffer-andchain_on_the_narrow_gauge.

(Continued)

*Primary Examiner* — Shirley Lu
(74) *Attorney, Agent, or Firm* — Yee & Associates, P.C.; Jay Wahlquist

(57) ABSTRACT

Activating a smart bumper system is provided. Traffic data are received from a set of sensors located on each of a plurality of vehicles within a defined area. A collision is predicted between two or more vehicles is imminent based on analyzing the traffic data. A smart bumper system of at least one of the two or more vehicles that will be involved in the predicted collision is actuated to minimize an amount of damage during the predicted collision.

17 Claims, 11 Drawing Sheets

(56) References Cited

U.S. PATENT DOCUMENTS

2018/0141544 A1* 5/2018 Xiao ................. G01S 13/862

OTHER PUBLICATIONS

Taleb et al., "Toward an Effective Risk-Concious and Collaborative Vehicular Collision Avoidance System", IEEE Transactions on Vehicular Technology, vol. 59, No. 3, Mar. 2010, 13 pages.
"Goldfinger (1964)", IMDb, Jan. 9, 1965, 4 pages. http://www.imdb.com/title/tt0058150/?ref_=fn_al_tt_1.
"Coolest Features of the James Bond Vehicles", InfiniGeeks, Nov. 24, 2013, 8 pages. http://infinigeek.com/coolest-features-of-the-james-bond-vehicles/.
Hale, "No Mr. Bond, I expect you to buy . . . 007's Goldfinger Ashton Martin set to fetch £4m", The Daily Mail Online, Jun. 1, 2010, 6 pages. http://www.dailymail.co.uk/motoring/article-1283169/James-Bond-Aston-Martin-Goldfinger-set-fetch-4m-auction.html.
"Buffer (rail transport)", Wikipedia, accessed Oct. 30, 2017, 3 pages. https://en.wikipedia.org/wiki/Buffer_(rail_transport).
Kochenderfer et al., "Next-Generation Airborne Collision Avoidance System", Massachusetts Institute of Technology, Jan. 1, 2012, 17 pages.
Berezovsky et al., "Is it possible to put very strong electromagnets in cars so that they repel each other? (which could reduce the force, and thus, the severity, of automobile collisions?)", Quora, Updated Oct. 17, 2013, 4 pages. https://www.quora.com/Is-it-possible-to-put-very-strong-electromagnets-in-cars-so-that-they-repel-each-other-which-could-reduce-the-force-and-thus-the-severity-of-automobile-collisions.
Ferguson "Collapsing Aluminum Electromagnetic Bumper", Prezi, Nov. 22, 2016, 2 pages. https://prezi.com/xb7d5iadqlb5/collapsing-aluminum-electromagnetic-bumper/.
"#StopTheCrash at the London Motor Show 2016", Thatcham Research, May 10, 2016, 2 pages. https://www.youtube.com/watch?v=om0CE6FvtuQ.
"Volvo XC60: City Safety Demonstration", VolvoXC60, Oct. 20, 2008, 2 pages. https://www.youtube.com/watch?v=8DBf8GBVmME.
"OLLI: Forward-thinking Transportation", Local Motors, accessed Jan. 2, 2018, 2 pages. http://meetolli.auto/.
"Airborne Collision Avoidance System (ACAS)", SKYbrary, last modified Dec. 27, 2017, 7 pages. https://www.skybrary.aero/index.php/Airborne_Collision_Avoidance_System_(ACAS).
"Airborne Collision Avoidance System (ACAS) Manual", International Civil Aviation Organization, 2006, 203 pages. https://www.icao.int/Meetings/anconf12/Document%20Archive/9863_cons_en.pdf.
Simonite, "Why a Chip That's Bad at Math Can Help Computers Tackle Harder Problems", MIT Technology Review, Apr. 14, 2016, 9 pages. https://www.technologyreview.com/s/601263/why-a-chip-thats-bad-at-math-can-help-computers-tackle-harder-problems/.
Modha, "Introducing a Brain-inspired Computer: TrueNorth's neurons to revolutionize system architecture", IBM Research, accessed Jan. 2, 2018, 6 pages. http://www.research.ibm.com/articles/brain-chip.shtml.
Hillen, "Samsung uses brain-inspired processors to create digital camera 'vision'", Digital Photography Review, Aug. 16, 2016, 7 pages. https://www.dpreview.com/news/7434690584/samsung-uses-brain-inspired-processors-to-create-digital-camera-vision/1.

* cited by examiner

INTEGRAL DAMAGE CONTROL BY INTERACTION BETWEEN A COLLISION DETECTION SYSTEM AND A BUMPER SYSTEM

BACKGROUND

1. Field

The disclosure relates generally to collision detection and more specifically to minimizing damage caused by a collision using a cognitive collision detection system that controls aspects associated with the collision and vehicular sub-systems, such as a smart bumper system.

2. Description of the Related Art

Currently, various kinds of vehicles, such as automobiles and trucks, include one or more driver assist systems, such as, for example, Advanced Emergency Braking Systems, Vehicle Stability Assist Systems, and Variable Assisted Power Steering Systems. An Advanced Emergency Braking System is an autonomous vehicle safety system that employs sensors to monitor proximity of other vehicles in front and detects situations where the relative speed and distance between the host vehicle and the other vehicles suggest that a collision is imminent. A Vehicle Stability Assist System helps to stabilize a vehicle during cornering if the vehicle turns more or less than desired. A Vehicle Stability Assist System also assists a driver in maintaining traction while accelerating on loose or slippery road surfaces by regulating the engine's output, and by selectively applying braking. A Variable Assisted Power Steering System provides a maximum degree of assist to a driver while parking, while providing a lesser degree of assist when traveling at highway speeds, by controlling and varying pressure to a steering gear or rack. In addition, many current vehicles have dummy bumpers to protect vehicle occupants.

SUMMARY

According to one illustrative embodiment, a computer-implemented method for activating a smart bumper system is provided. Traffic data are received from a set of sensors located on each of a plurality of vehicles within a defined area. A collision is predicted between two or more vehicles is imminent based on analyzing the traffic data. A smart bumper system of at least one of the two or more vehicles that will be involved in the predicted collision is actuated to minimize an amount of damage during the predicted collision. According to other illustrative embodiments, a data processing system and computer program product for activating a smart bumper system are provided.

DETAILED DESCRIPTION

Figure 1:
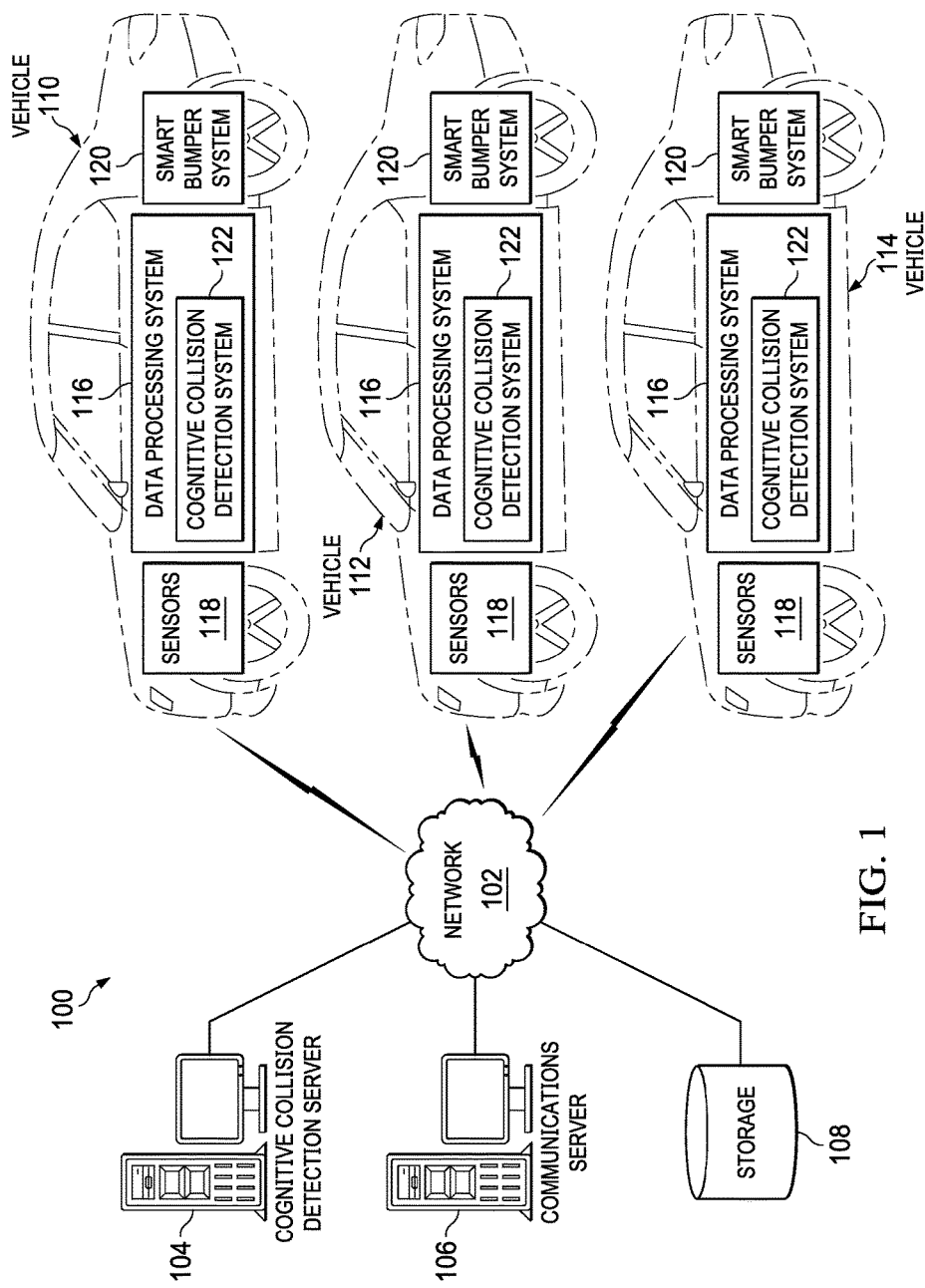
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In this example, server 104 is a cognitive collision detection server that provides a set of cognitive collision detection services to client devices. Cognitive means that collision detection server 104 uses artificial intelligence, which includes machine learning, to recognize and learn collision patterns to predict collisions between or among objects, such as vehicles, pedestrians, animals, inanimate objects, or combinations thereof, and to minimize the damage that will be caused by these collisions. Also, it should be noted that cognitive collision detection server 104 may represent a plurality of servers hosting a plurality of different cognitive collision detection services. Server 106 is a communications server corresponding to a service provider that provides communication services to client devices. In addition, it should be noted that communications server 106 may represent a plurality of different communications servers hosting a plurality of different communication services.

Vehicle 110, vehicle 112, and vehicle 114 also connect to network 102. Vehicles 110, 112, and 114 are clients of cognitive collision detection server 104 and communications server 106. In this example, vehicles 110, 112, and 114 are illustrated as automobiles with wireless communication links to network 102. However, it should be noted that vehicles 110, 112, and 114 are meant as examples only. In other words, vehicles 110, 112, and 114 may include other types of vehicles, such as, for example, pickup trucks, sport utility vehicles, motorcycles, bicycles, all-terrain vehicles, semi-tractor trailers, vans, buses, trains, subway trains, trams, planes, unmanned aerial vehicles, balloons, boats, ships, submarines, and the like, with or without wireless communication links to network 102.

Also in this example, vehicles 110, 112, and 114 each include data processing system 116, sensors 118, and smart bumper system 120. Data processing system 116 represents an onboard computer for processing data and other information. Data processing system 116 includes cognitive collision detection system (CCDS) 122. Cognitive collision detection system 122 performs functions similar to cognitive collision detection server 104 and is capable of communicating and exchanging data with cognitive collision detection server 104 and other cognitive collision detection systems located in other vehicles. However, it should be noted that cognitive collision detection system 122 may operate autonomously without being in communication with and receiving data from cognitive collision detection server 104 and other cognitive collision detection systems located in other vehicles.

Sensors 118 represent a set of one or more sensors located on each of vehicles 110, 112, and 114. Sensors 118 may include, for example, imaging devices, such as video or still picture cameras, heat sensing devices, metal sensing devices, geolocation sensing devices, speed sensing devices, distance sensing devices, motion sensing devices, and the like. Sensors 118 also may include systems, such as, for example, laser imaging, detection, and ranging systems, radar systems, intelligent video analytics systems, and the like.

Smart bumper system 120 represents a set of one or more different types of bumpers that may include, for example, retractable sliding bumpers, pneumatic bumpers, electromagnetic bumpers, and the like. Cognitive collision detection system 122 controls the activation and deployment of smart bumper system 120. For example, cognitive collision detection system 122 determines and selects the appropriate type of bumper in smart bumper system 120 to deploy to decrease, minimize, or eliminate an amount of damage that may be caused by an immanent collision with another object, such as a vehicle, pedestrian, animal, inanimate object, or combination thereof, based on information received or retrieved from local and/or remote data sources.

Storage 108 is a network storage device capable of storing any type of data in a structured format or an unstructured format. In addition, storage 108 may represent a plurality of network storage devices. Further, storage 108 may store, for example, identifiers for a plurality of vehicle data processing systems and their corresponding cognitive collision detection systems; vehicle sensor data; vehicle geolocation data, such as global positioning system data corresponding to a plurality of different vehicles; information, such as weather data, traffic data, social media data, and vehicle specification data; and the like. Furthermore, storage unit 108 may store other types of data, such as authentication or credential data that may include user names, passwords, and biometric data associated with system administrators and users, for example.

In addition, it should be noted that network data processing system 100 may include any number of additional servers, client data processing systems, storage devices, and other devices not shown. Program code located in network data processing system 100 may be stored on a computer readable storage medium and downloaded to a computer or other data processing device for use. For example, program code may be stored on a computer readable storage medium on cognitive collision detection server 104 and downloaded to data processing system 116 of vehicle 110 over network 102 for use on data processing system 116.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
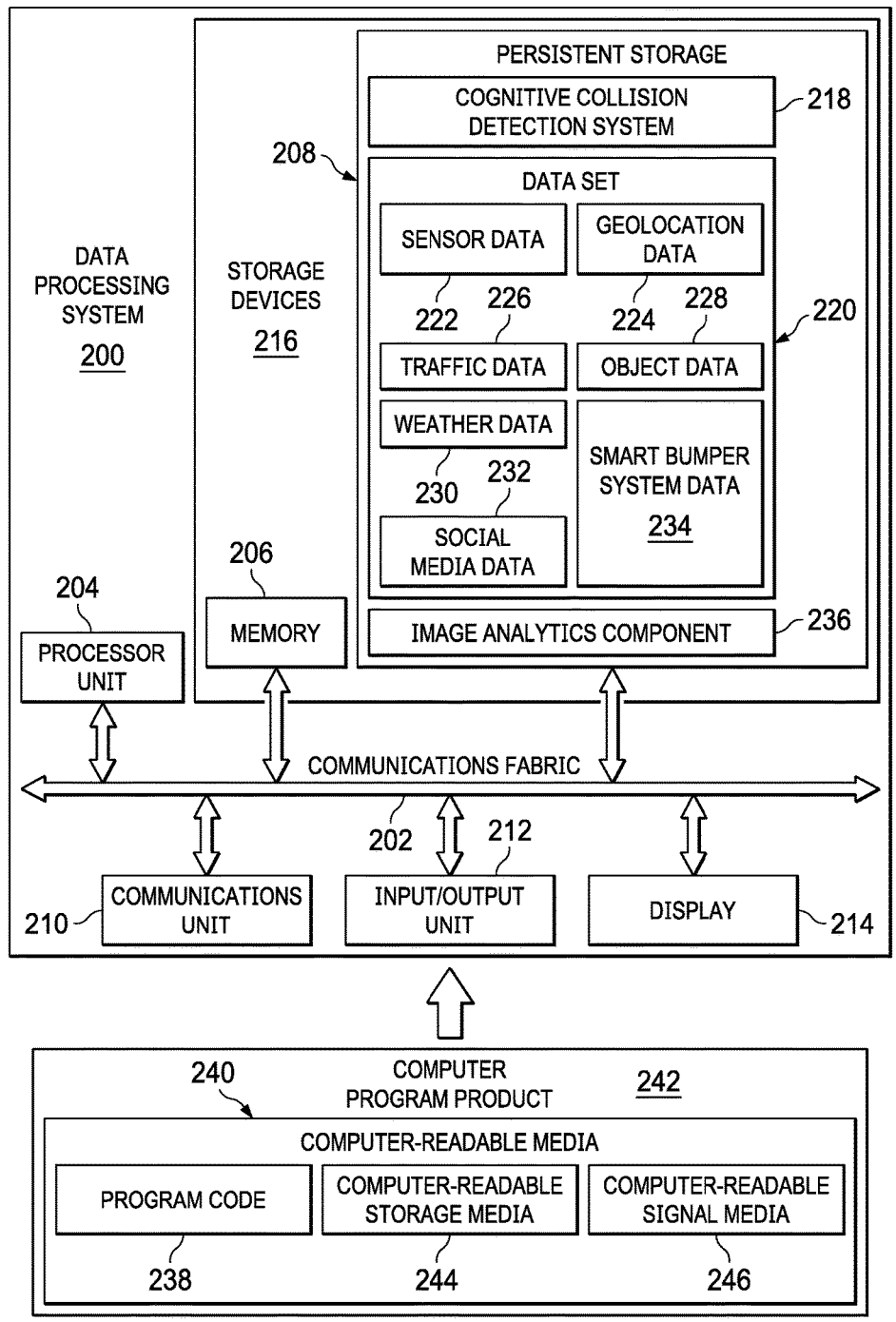
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer or other type of data processing device, such as cognitive collision detection server 104 or data processing system 116 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be a neuron processor, such as neuromorphic complementary metal-oxide-semiconductor integrated circuit containing thousands of cores, which mimics a biological nervous system. As another illustrative example, processor unit 204 may be a symmetric multi-processor system containing multiple processors of the same type or a heterogeneous multi-processor system containing multiple processors of different types.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores cognitive collision detection system 218. However, it should be noted that even though cognitive collision detection system 218 is illustrated as residing in persistent storage 208, in an alternative illustrative embodiment cognitive collision detection system 218 may be a separate component of data processing system 200. For example, cognitive collision detection system 218 may be a hardware component coupled to communication fabric 202 or a combination of hardware and software components. In another alternative illustrative embodiment, a first set of components of cognitive collision detection system 218 may be located on data processing system 200, while a second set of components of cognitive collision detection system 218 may be located on a server computer, such as cognitive collision detection server 104 in FIG. 1. In yet another alternative illustrative embodiment, cognitive collision detection system 218 may be located on the server computer instead of data processing system 200.

Cognitive collision detection system 218 may be, for example, cognitive collision detection system 122 in FIG. 1. Cognitive collision detection system 218 controls the process of detecting that a collision with an object is immanent and determining the optimal smart bumper system option to deploy to reduce or eliminate an amount of damage that will be caused by the collision based on data set 220. Data set 220 represents a multitude of different information that cognitive collision detection system 218 obtains from local and/or remote data sources to predict collisions and actuate appropriate smart bumper system countermeasures. In this example, data set 220 includes sensor data 222, geolocation data 224, traffic data 226, object data 228, weather data 230, social media data 232, and smart bumper system data 234. However, it should be noted that data set 220 may include more or less information than shown.

Sensor data 222 represent information captured by a set of sensors located on a vehicle, such as sensors 118 located on vehicle 110 in FIG. 1. Cognitive collision detection system 218 may utilize image analytics component 236 to preprocess and analyze video and/or still picture images contained in sensor data 222 to determine what is currently happening in real-time in the vicinity immediately surrounding the vehicle. What is currently happening may include, for example, number and type of objects in the immediate vicinity, speed of objects, distance between objects, distance from objects to the vehicle, road conditions, and the like. The immediate vicinity surrounding the vehicle may be, for example, a predefined distance from the vehicle in all directions (e.g., 360 degrees around the vehicle). Image analytics component 236 may be, for example, an intelligent video analytics system, which may utilize approximate processing elements to process the image data.

Geolocation data 224 represent information regarding a current geographic location of the vehicle. Geolocation data 224 may be generated by a geolocation sensing device, such as, for example, a global positioning system transceiver. Geolocation data 224 also may represent information regarding current geographic locations of other vehicles and objects capable of transmitting such information to cognitive collision detection system 218.

Traffic data 226 represent information regarding an amount of vehicular traffic on a roadway that the vehicle is currently traveling. Cognitive collision detection system 218 may receive traffic data 226 from an online service that provides such traffic information. Object data 228 represent information regarding the vehicle, itself, and objects in the immediate vicinity around the vehicle. Object data 228 may include, for example, specifications, such as size, weight, composition material, and the like, corresponding to respective objects.

Weather data 230 represent information regarding current weather conditions in the vicinity surrounding the vehicle. Cognitive collision detection system 218 may receive weather data 230 from an online service that provides such weather information. Social media data 232 represent information posted on one or more social media websites. Social media data 232 may include, for example, social media messages corresponding to current traffic, such as hashtag #traffic. Social media data 232 also may include aggregated social navigation information provided by a plurality of different drivers to a social navigation application. Cognitive collision detection system 218 may retrieve social media data 232 from social media web sites that provide such information.

Smart bumper system data 234 represent information corresponding to the different bumper options, such as a retractable bumper option, an electromagnetic bumper option, and/or an external air bag or pneumatic bumper option, available on the vehicle. Smart bumper system data 234 also may include information regarding parameters corresponding to the different bumper options, such as, for example, kinetic energy ranges for sliding the mechanical retractable bumper outward from the vehicle, horizontal and vertical angle limits for deploying the mechanical retractable bumper outward from the vehicle, electromagnetic field strength ranges for projection outward from the electromagnetic bumper, pressure ranges for injecting air into the pneumatic bumper, and the like. Cognitive collision detection system 218 utilizes smart bumper data 234 to determine and select the optimal smart bumper system option to minimize or eliminate damage that will be caused by a collision with another object or set of two or more objects based on data set 220.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that current driver assist systems focus on how to avoid a collision from an inward, self-centered perspective. In addition, dummy bumpers are designed to work for common situations. However, these current driver assist systems and dummy bumpers are not capable of determining and selecting the best possible option for protecting vehicle occupants and collision-involved objects. For example, in certain situations a collision is unexpected and inevitable for different reasons, such as, for example: a child or an animal, such as a deer, may inadvertently place themselves on an unforeseeable collision course with a vehicle; an inanimate object, such as a boulder, may fall unexpected from a mountainside onto a lane of traffic; a driver of a vehicle may lose control due to a medical problem and suddenly swerve on a head-on collision course with other vehicles; or a vehicle in the vicinity of a collision may make an unexpected and sudden maneuver to avoid the collision.

Illustrative embodiments utilize a cognitive collision detection system, which predicts unexpected collision situations based on a plurality of data inputs, such as sensor data inputs, determines and selects the best option or combination of options to minimize damage that will be caused by a collision, and issues instructions to a smart bumper system to deploy the selected option or combination of options (e.g., a mechanical retractable bumper, an electromagnetic bumper, a pneumatic bumper, or a combination thereof) with their corresponding parameters (e.g., level of kinetic energy to slide the mechanical retractable bumper outward, horizontal and vertical angle to deploy the mechanical retractable bumper outward, strength of the electromagnetic field to project from the electromagnetic bumper, amount of air pressure to inject into the pneumatic bumper, and the like). Illustrative embodiments enable cognitive collision detection systems to communicate with one another to coordinate selection of smart bumper system options to minimize damage that will be caused by a collision. It should be noted that cognitive collision detection systems and smart bumper systems may be complementary components of an entire set of collision avoidance systems in driver-based and autonomous vehicles.

Illustrative embodiments may be utilized for inevitable collisions between or among objects, which may or may not have conforming or inter-operable communication standards on board. Illustrative embodiments utilize cognitive collision detection systems, which determine the best possible configuration of an associated smart bumper system to reduce the negative impact (e.g., damage) of a collision, from a local (e.g., a specific vehicle) perspective, as well as, from an overall (e.g., all affected objects, such as vehicles, vehicle occupants, pedestrians, animals, and inanimate objects) perspective based on complete information, incomplete information (e.g., when communication between or among objects is not possible for whatever reason), structured data (e.g., vehicle specification information, vehicle speed information, and vehicle direction information), and unstructured data (e.g., streaming video data from imaging sensors).

Figure 3:
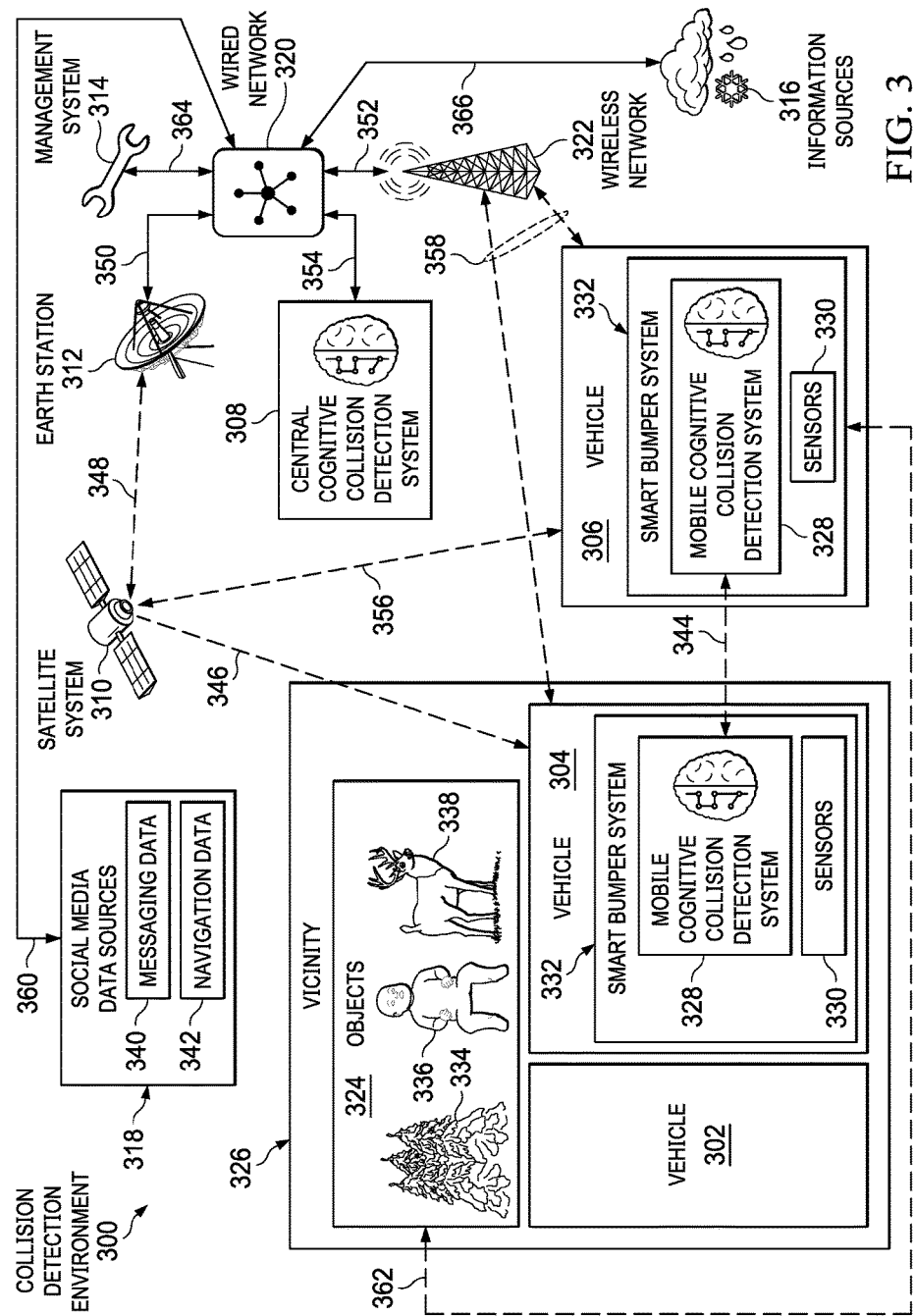
FIG. 3 is a diagram illustrating an example of a collision detection environment in accordance with an illustrative embodiment.

With reference now to FIG. 3, a diagram illustrating a collision detection environment is depicted in accordance with an illustrative embodiment. Collision detection environment 300 may be implemented in a network of data processing systems, such as network data processing system 100 in FIG. 1. Collision detection environment 300 is a system of hardware and software components for detecting a collision between or among two or more objects, such as vehicles, pedestrians, animals, and inanimate objects, and minimizing an amount of damage that will be caused by the collision.

In this example, collision detection environment 300 includes vehicle 302, vehicle 304, vehicle 306, central cognitive collision detection system 308, satellite system 310, earth station 312, management system 314, information sources 316, social media data sources 318, wired network 320, wireless network 322, and objects 324 in vicinity 326 of vehicles 302 and 304. However, it should be noted that collision detection environment 300 is only intended as an example and not as a limitation on illustrative embodiments. In other words, collision detection environment 300 may include any number of vehicles, central cognitive collision detection systems, satellite systems, earth stations, management systems, information sources, social media data sources, wired networks, wireless networks, and objects not shown.

Vehicles 302, 304, and 306 may represent any type of vehicle, such as a passenger vehicle, truck, bus, motorcycle, ship, subway train, and the like. In this example, vehicles 304 and 306 each include their own respective mobile cognitive collision detection system 328, sensors 330, and smart bumper system 332. Mobile cognitive collision detection system 328, sensors 330, and smart bumper system 332 may be, for example, cognitive collision detection system 122, sensors 118, and smart bumper system 120 in FIG. 1. Also, it should be noted that vehicle 302 does not contain a cognitive collision detection system, sensors, or a smart bumper system.

Sensors 330 represent a plurality of different types of sensors located on respective vehicles. Sensors 330 may include, for example, intelligent video analytic camera distance sensors, intelligent metal detector sensors, intelligent heat detector sensors, intelligent motion detector sensors, and the like. In addition, sensors 330 may include, for example, approximate processing elements to preprocess the sensor data for mobile cognitive collision detection system 328.

Smart bumper system 332 may include one or more of an electromagnetic bumper, a retractable coil bumper, a pressure adjustable external airbag bumper, and a form factor and angle adjustable bumper. Also, smart bumper system 332 may be capable of protecting vehicle 304, as well as vehicle 302 and objects 324 in vicinity 326 that are on a collision course with vehicle 304. In this example, objects 324 include inanimate object 334, human 336, and animal 338. Inanimate object 334 may include, for example, a tree, rock, snow drift, hay bale, sign, pole, or the like. Human 336 may include, for example, a pedestrian, such as child. Animal 338 may include, for example, a deer, dog, cat, cow, kangaroo, bird, whale, or the like. In addition, it should be noted that mobile cognitive collision detection system 328 also may be associated with human 336 and animal 338.

Central cognitive collision detection system 308 may be, for example, a centralized cognitive collision detection server, such as cognitive collision detection server 104 in FIG. 1, or a cluster of centralized cognitive collision detection servers. Alternatively, central cognitive collision detection system 308 may be a cluster of cloud-based cognitive collision detection systems. Central cognitive collision detection system 308 communicates with mobile cognitive collision detection system 328 to exchange data.

Satellite system 310 represents one or more satellite broadcasting services, such as, for example, global positioning system satellite systems or other geolocation satellite systems. Earth station 312 represents one or more earth stations for receiving satellite signals from satellite system 310. Management system 314 represents one or more cognitive collision detection and smart bumper management systems for enforcing policies, such as, for example, traffic laws. In addition, management system 314 may manage software updates or upgrades to mobile cognitive collision detection system 328 and smart bumper system 332.

Information sources 316 represent one or more remote information sources, which provide structured and unstructured data corresponding to collision predictions. Information sources 316 may include, for example, weather and traffic channels that provide local weather and traffic conditions, such as freezing rain, snow-covered streets, heavy crosswinds, and the like, for vicinity 326.

Social media data sources 318 represent a plurality of social media data sources. In this example, social media data sources 318 include messaging data 340 and navigation data 342. Messaging data 340 may be, for example, social media posts, such as hashtag #traffic. Navigation data 342 may be, for example, social navigation information provided by drivers of vehicles in vicinity 326.

Wired network 320 represents one or more wired networks, which may be, for example, internet protocol-based networks, connecting different components of collision detection environment 300. Wireless network 322 represents one or more wireless networks, which may be, for example, mobile telecommunications networks, connecting different components of collision detection environment 300.

Communication 344 represents a bidirectional wireless communication link between mobile cognitive collision detection system 328 of vehicle 304 and mobile cognitive collision detection system 328 of vehicle 306. Communication 346 represents a satellite downlink. Communication 348 represents a bidirectional communication link between satellite system 310 and earth station 312.

Communication 350 represents a bidirectional communication link between earth station 312 and wired network 320. Communication 352 represents a bidirectional communication between wired network 320 and wireless network 322. Communication 354 represents a bidirectional communication link between earth station 312 and central cognitive collision detection system 308.

Communication 356 represents a bidirectional communication link between satellite system 310 and respective mobile cognitive collision detection systems 328. It should be noted that respective vehicles, which contain mobile cognitive collision detection systems 328, include an antenna apparatus capable of receiving satellite signals. Communication 358 represents a bidirectional communication link between wireless network 322 and respective vehicles (e.g., vehicles 304 and 306) containing mobile cognitive collision detection systems 328.

Communication 360 represents a bidirectional communication link between social media data sources 318 and wired network 320. Communication 362 represents a bidirectional or unidirectional communication link between human 336, which may be wearing a smart garment, such as a smart belt or smart helmet that transmits a warning signal, and respective vehicles containing mobile cognitive collision detection system 328. Communication 364 represents a bidirectional communication link between management system 314 and wired network 320. Communication 366 represents a bidirectional communication link between wired network 320 and information sources 316.

Figure 4:
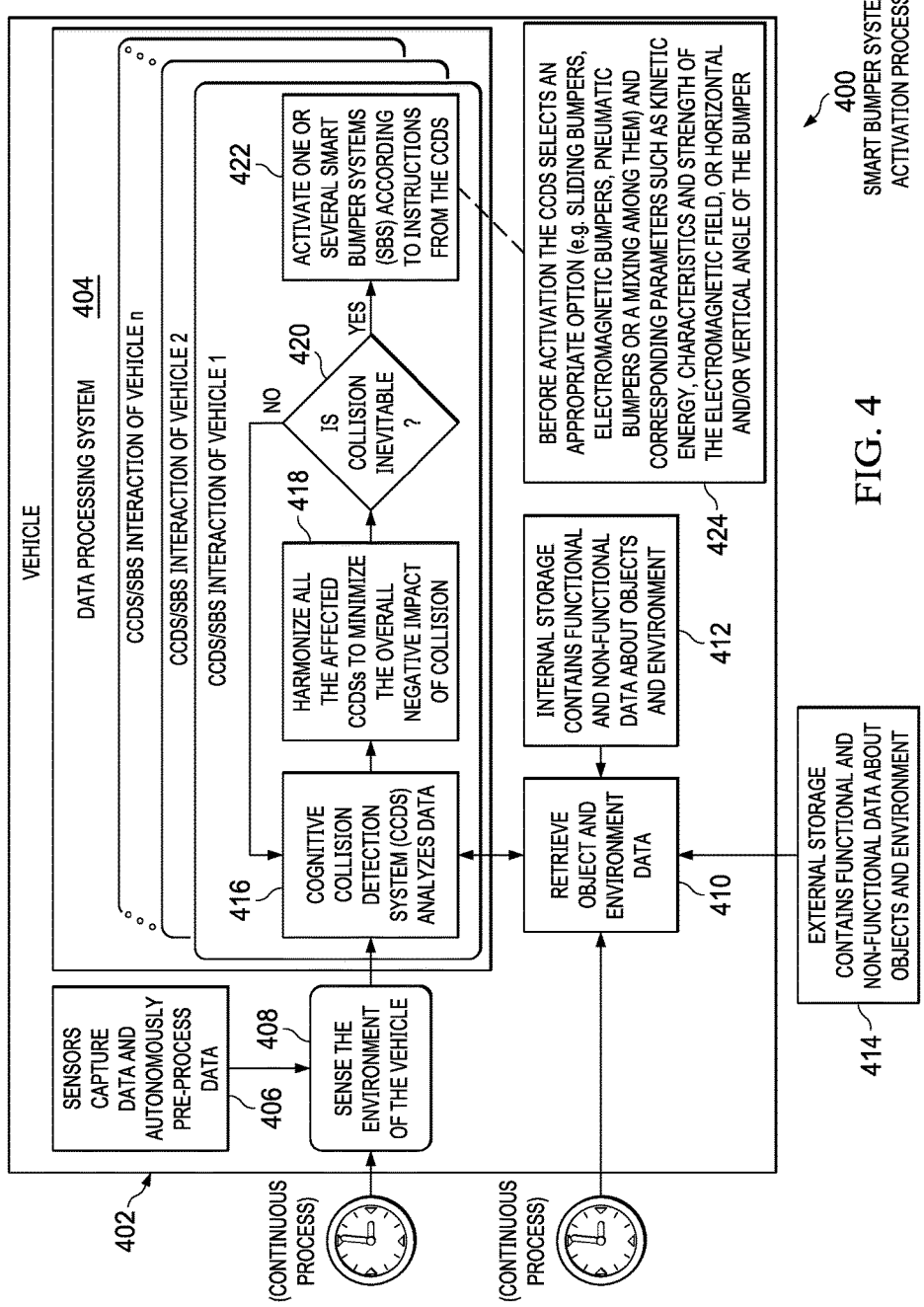
FIG. 4 is a diagram illustrating an example of a smart bumper system activation process in accordance with an illustrative embodiment.

With reference now to FIG. 4, a diagram illustrating an example of a smart bumper system activation process is depicted in accordance with an illustrative embodiment. Smart bumper system activation process 400 may be implemented in a collision detection environment, such as collision detection environment 300 in FIG. 3. Smart bumper system activation process 400 includes vehicle 402, such as vehicle 304 in FIG. 3.

Vehicle 402 contains data processing system 404, such as, for example, data processing system 116 in FIG. 1 or data processing system 200 in FIG. 2. Data processing system 404 includes a cognitive collision detection system, such as, for example, cognitive collision detection system 122 in FIG. 1, cognitive collision detection system 218 in FIG. 2, or mobile cognitive collision detection system 328 in FIG. 3.

At 406, sensors, such as, for example, sensors 118 in FIG. 1 or sensors 330 in FIG. 3, of vehicle 402 capture data and autonomously preprocess the data for the cognitive collision detection system. The captured sensor data provides a sense of the environment surrounding vehicle 402 at 408. At 410, the cognitive collision detection system retrieves object and environment data from internal storage 412 and external storage 414. Internal storage 412 may be, for example, persistent storage 208 in FIG. 2, and external storage 414 may be, for example, cognitive collision detection server 104 and/or storage 108 in FIG. 1. Internal storage 412 and external storage 414 both contain functional and non-functional data about objects and the environment in the vicinity of vehicle 402. The vicinity of vehicle 402 may be, for example, vicinity 326 of vehicle 304 in FIG. 3.

At 416, the cognitive collision detection system analyzes the captured sensor data and the functional and non-functional data retrieved from internal storage 412 and external storage 414 using natural language processing and machine learning. Further, at 418, the cognitive collision detection system harmonizes with all affected cognitive collision detection systems in the vicinity of vehicle 402 to minimize the overall negative impact (e.g., damage) of a predicted collision based on the data analysis.

At 420, the cognitive collision detection system makes a determination as to whether a collision between vehicle 402 and one or more other objects is inevitable. If the cognitive collision detection system determines that a collision is not inevitable, then process 400 returns to 416 where the cognitive collision detection system continues to analyze the data. If the cognitive collision detection system determines that a collision is inevitable, then process 400 proceeds to 422 where the cognitive collision detection system activates one or more smart bumper systems, such as, for example, smart bumper system 332 in FIG. 3, according to instructions from the cognitive collision detection system. However, before activation of the one or more smart bumper systems, the cognitive collision detection system at 424 selects an appropriate smart bumper system option, such as, for example, a sliding coil bumper, an electromagnetic bumper, a pneumatic bumper, or a combination thereof, and its corresponding parameters, such as, for example, kinetic energy level, strength of the electromagnetic field, or horizontal and vertical angle deployment of the bumper.

Figure 5:
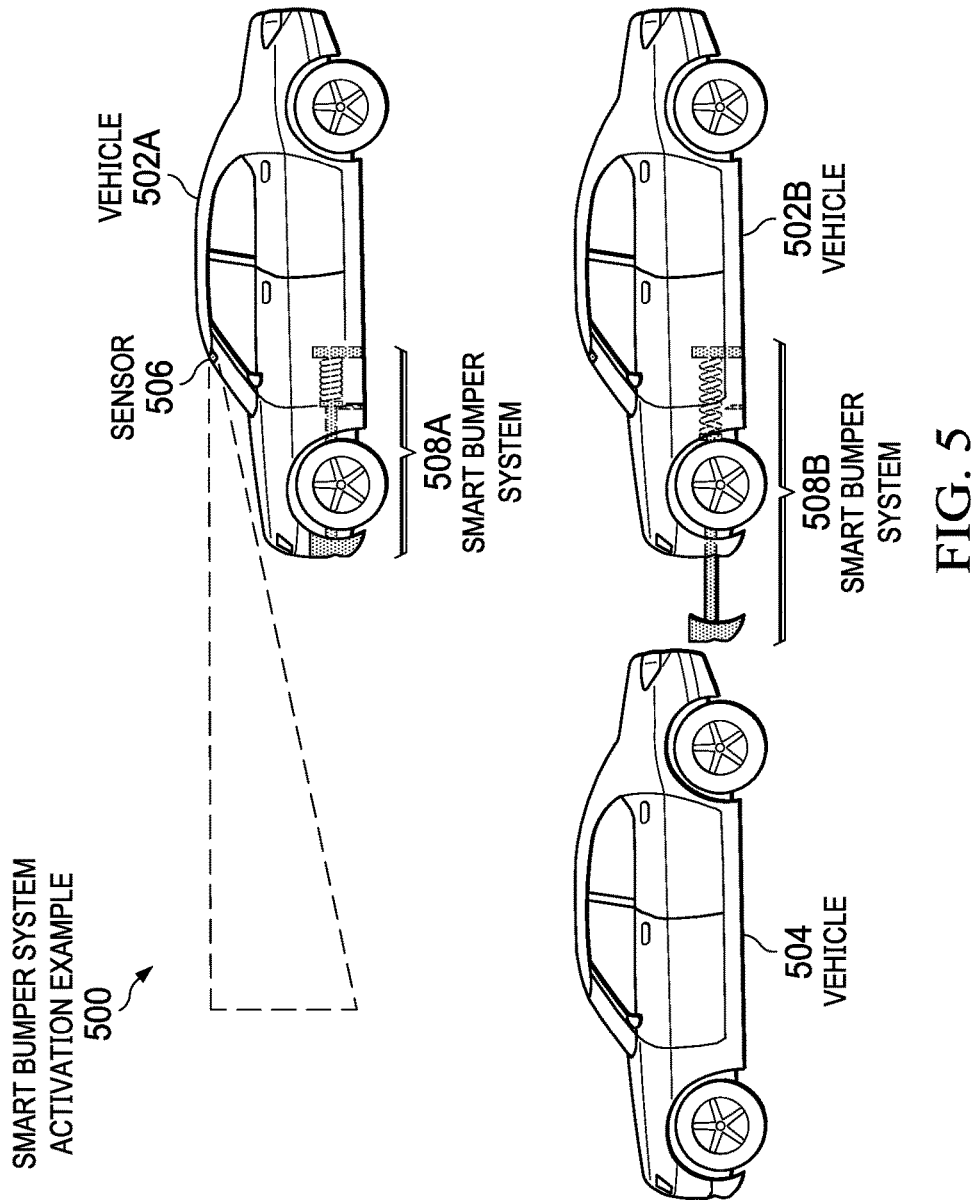
FIG. 5 is a diagram illustrating a smart bumper system activation example in accordance with an illustrative embodiment.

With reference now to FIG. 5, a diagram illustrating a smart bumper system activation example is depicted in accordance with an illustrative embodiment. Smart bumper system activation example 500 includes vehicle 502A, vehicle 502B, and vehicle 504. It should be noted that vehicle 502A and vehicle 502B represent the same vehicle. Also, it should be noted in this example that vehicle 502 is the only vehicle that contains a cognitive collision detection system and smart bumper system. In other words, vehicle 504 does not contain a cognitive collision detection system and smart bumper system in this example. Further, it should be noted that vehicle 502 and vehicle 504 are automobiles of approximately the same size and dimensions.

Vehicle 502 includes sensor 506. Sensor 506 provides real-time data to the cognitive collision detection system. In this example, the sensor data from sensor 506 indicates that collision with vehicle 504 is immanent. Vehicle 502A illustrates smart bumper system 508A in an unactuated state. Vehicle 502B illustrates smart bumper system 508B in an actuated state. In other words, smart bumper system 508A and smart bumper system 508B represent the same smart bumper system in different states (i.e., unactuated and actuated, respectively). In this example, smart bumper system 508 includes a mechanical retractable bumper.

The cognitive collision detection system captures in real-time various structured and unstructured data corresponding to the current situation in the vicinity surrounding vehicle 502. For example, the cognitive collision detection system may receive preprocessed streaming video data from sensor 506 regarding information, such as velocity and vector (i.e., direction) of all involved objects and object specific functional and non-functional information, such as make, model, and year of a vehicle. The cognitive collision detection system may utilize, for example, an intelligent video analytics system to identify this information in order to make conclusions on object specifications, such as number of seats, number of airbags, dimensions, and mode of propulsion mode (e.g., 4-wheel drive), with regard to vehicles or material properties (e.g., rock or straw bale) with regard to other types of objects.

When the cognitive collision detection system determines that a collision with vehicle 504 is inevitable, the cognitive collision detection system will instruct smart bumper system 508B to deploy the retractable bumper. The cognitive collision detection system also determines the best possible parameters, such as speed and angle, for deploying the retractable bumper to maximize shock absorption to ultimately minimize crash impact on vehicle 502B and its occupants, as well as, vehicle 504 involved in the collision.

Figure 6:
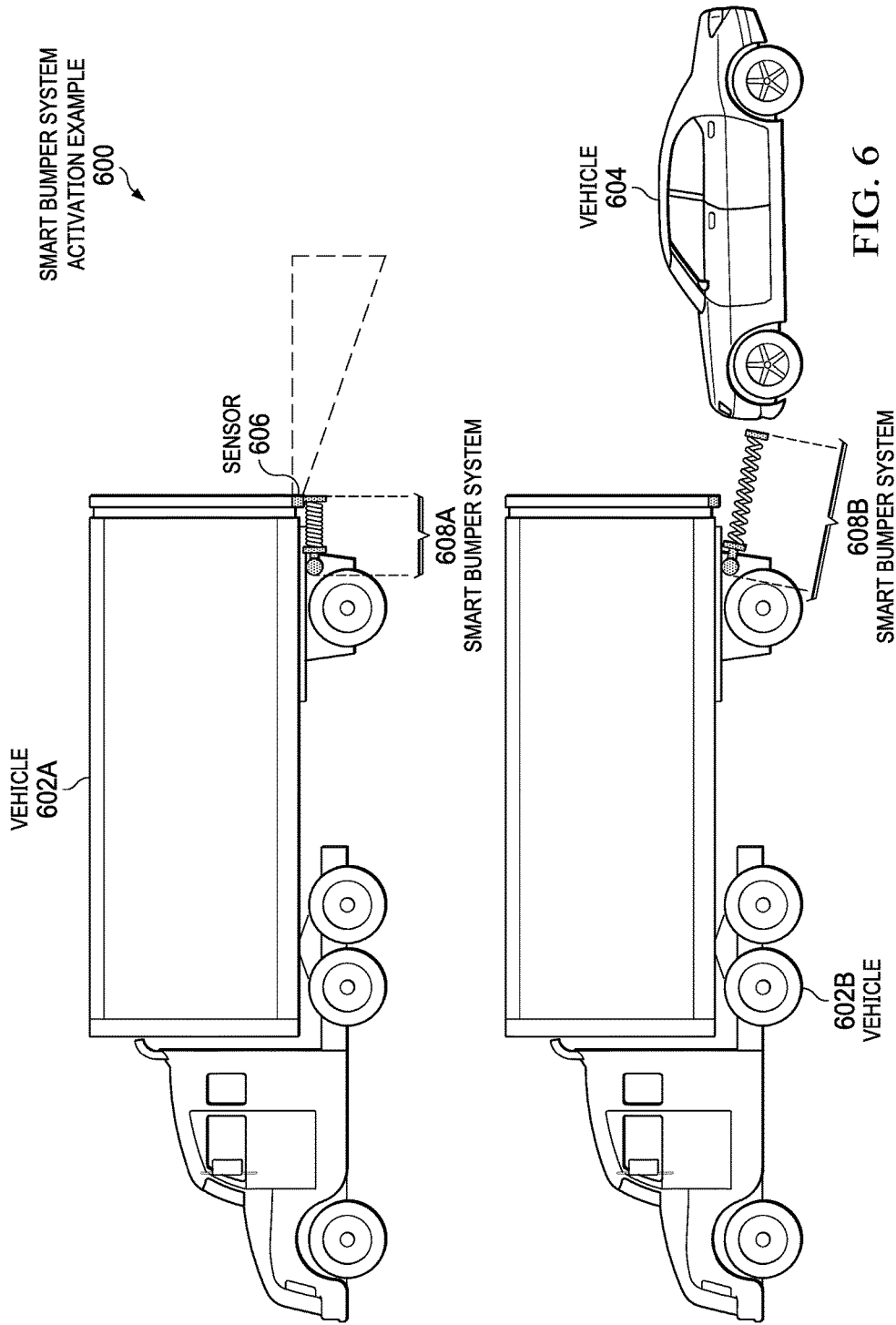
FIG. 6 is a diagram illustrating another smart bumper system activation example in accordance with an illustrative embodiment.

With reference now to FIG. 6, a diagram illustrating another smart bumper system activation example is depicted in accordance with an illustrative embodiment. Smart bumper system activation example 600 includes vehicle 602A, vehicle 602B, and vehicle 604. It should be noted that vehicle 602A and vehicle 602B represent the same vehicle. Also, it should be noted in this example that vehicle 602 is the only vehicle that contains a cognitive collision detection system and smart bumper system. In other words, vehicle 604 does not contain a cognitive collision detection system and smart bumper system in this example. Further, it should be noted that vehicle 602 is a semi-tractor trailer and vehicle 604 is an automobile. In other words, vehicle 602 and vehicle 604 are of different sizes and dimensions.

Vehicle 602 includes sensor 606. Sensor 606 provides real-time data to the cognitive collision detection system. In this example, the sensor data from sensor 606 indicates that collision with vehicle 604 is immanent. Vehicle 602A illustrates smart bumper system 608A in an unactuated state. Vehicle 602B illustrates smart bumper system 608B in an actuated state. In other words, smart bumper system 608A and smart bumper system 608B represent the same smart bumper system in different states (i.e., unactuated and actuated, respectively). In this example, smart bumper system 608 includes a retractable coil bumper.

The cognitive collision detection system collects current real-time structured and unstructured data corresponding to the current environment surrounding vehicle 602. In addition, the cognitive collision detection system identifies a least invasive impact point for smart bumper system-enabled vehicle 602 and for vehicle 604. The cognitive collision detection system instructs smart bumper system 608B to deploy at the optimal vertical and/or horizontal angle at the appropriate time to minimize collision damage. This decreases collision impact and possibly protects passenger areas or other areas outside of the vehicle. In this example, the cognitive collision detection system instructs smart bumper system 608B to target the front bumper of smaller vehicle 604 rather than the grill or the windshield.

Figure 7:
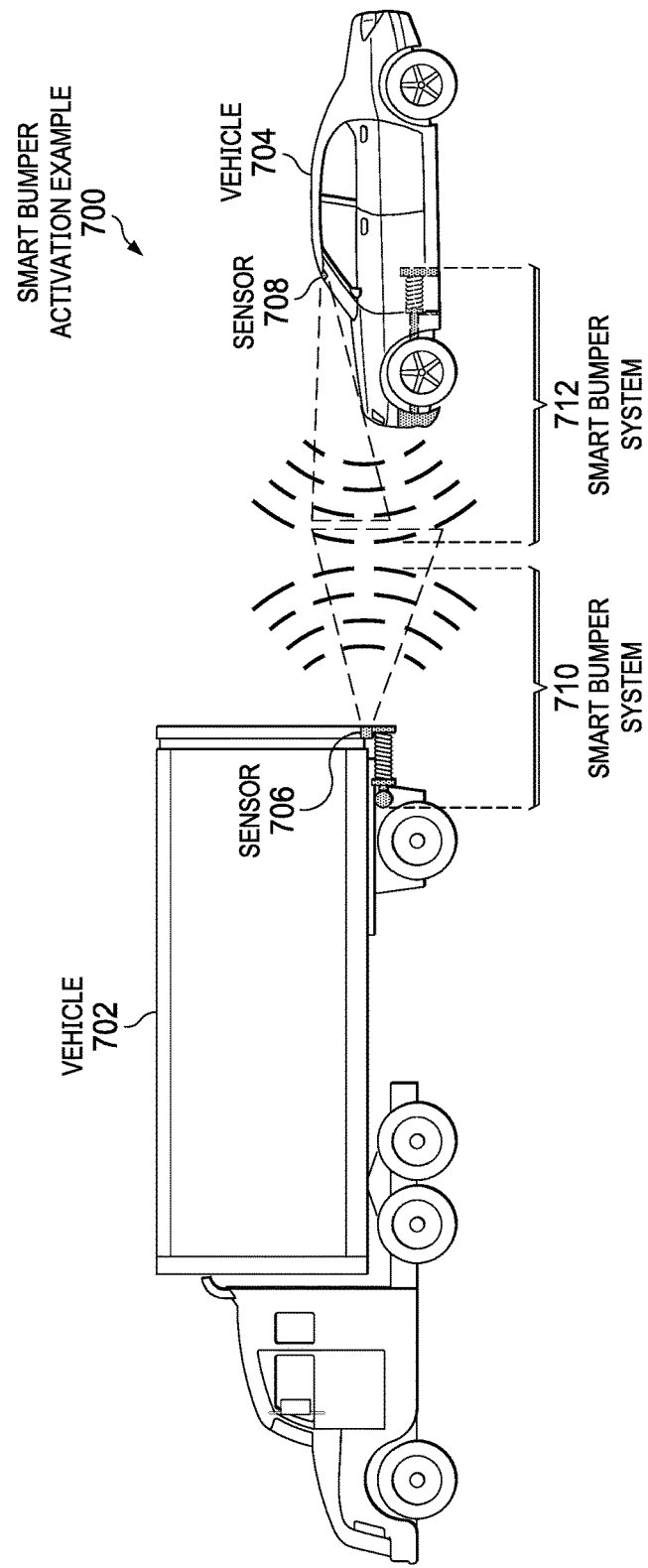
FIG. 7 is a diagram illustrating yet another smart bumper system activation example in accordance with an illustrative embodiment.

With reference now to FIG. 7, a diagram illustrating yet another smart bumper system activation example is depicted in accordance with an illustrative embodiment. Smart bumper system activation example 700 includes vehicle 702 and vehicle 704. It should be noted that vehicle 702 and vehicle 704 both include a cognitive collision detection system and smart bumper system. Also, it should be noted that vehicle 702 is a semi-tractor trailer and vehicle 704 is an automobile. In other words, vehicle 702 and vehicle 704 are of different sizes and dimensions.

Vehicle 702 includes sensor 706 and vehicle 704 includes sensor 708. Sensors 706 and 708 provide real-time data to the cognitive collision detection systems of vehicle 702 and vehicle 704, respectively. In this example, the sensor data from sensors 706 and 708 indicate that collision between vehicle 702 and vehicle 704 is immanent.

Vehicle 702 includes smart bumper system 710. Vehicle 704 includes smart bumper system 712. In this example, smart bumper system 710 and smart bumper system 712 each include a retractable coil bumper and an electromagnetic bumper.

The respective cognitive collision detection systems of vehicles 702 and 704 collect different current real-time structured and unstructured data corresponding to the current environment surrounding vehicles 702 and 704. In addition, the two cognitive collision detection systems exchange information with each other to improve the overall collision result. Furthermore, the two cognitive collision detection systems may exchange information with a central cognitive collision detection system.

In collaboration, the cognitive collision detection systems determine which smart bumper system option to deploy and how to deploy the option to minimize the damage that will be caused by the impact. In this example, the cognitive collision detection systems determine that the electromagnetic bumper option should be activated in both vehicle 702 and vehicle 704 and that the retractable coil bumpers remain in an unactuated state. However, it should be noted that in certain situations it may make more sense to only actuate one smart bumper system. This may prevent any potential increase in damage when the cognitive collision detection systems are working independently and not in collaboration.

Figure 8:
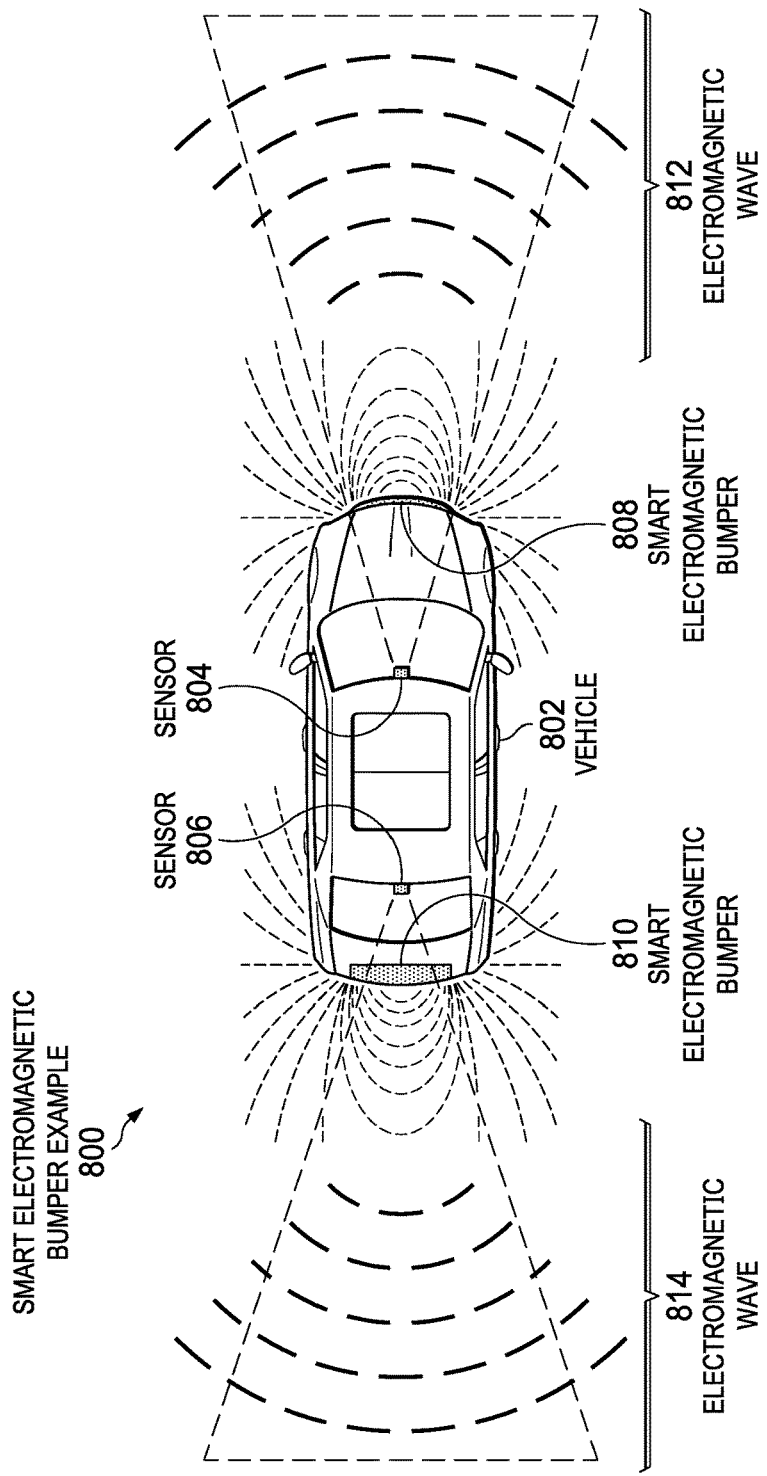
FIG. 8 is a diagram illustrating an example of a smart electromagnetic bumper in accordance with an illustrative embodiment.

With reference now to FIG. 8, a diagram illustrating an example of a smart electromagnetic bumper is depicted in accordance with an illustrative embodiment. Smart electromagnetic bumper example 800 is implemented in vehicle 802, such as vehicle 704 in FIG. 7. In this example, vehicle 802 includes sensor 804 and sensor 806. Sensor 804 is a forward-looking sensor, whereas sensor 806 is a rearward-looking sensor. Vehicle 802 also includes smart electromagnetic bumper 808 and smart electromagnetic bumper 810. Smart electromagnetic bumper 808 represents a front bumper of vehicle 802 and smart electromagnetic bumper 810 represents a rear bumper of vehicle 802.

Smart electromagnetic bumper 808 is capable of generating electromagnetic wave 812 and smart electromagnetic bumper 810 is capable of generating electromagnetic wave 814. However, it should be noted that certain criteria need to be met in order for smart electromagnetic bumper 808 and smart electromagnetic bumper 810 to be effective in a collision. The criteria may include, for example: a) that vehicle 802 can call up the required electrical power to generate a strong enough electromagnetic wave or field within the available time period before the collision; b) that a vehicle on collision course with vehicle 802 also has an electromagnetic bumper onboard; or c) that a vehicle on collision course with vehicle 802 has bumpers made of antiferromagnetic material (e.g., chromium) or at least diamagnetic material (e.g., carbon).

If the cognitive collision detection system determines that the electromagnetic bumper can be used based on the data analysis, then the cognitive collision detection system determines the appropriate paraments for the electromagnetic bumper based on additional information from the objects on a collision course. The additional information may include, for example: a) direction; b) kinetic energy; c) position and distance among affected objects (e.g., determined by global positioning system signals, laser imaging, detection, and ranging systems, radar systems, or stereo-video analytics systems); and d) parameters corresponding to the electromagnetic bumper, which may include the maximum strength of the electromagnetic wave or field the electromagnetic bumper can generate. It should be noted that the cognitive collision detection systems between vehicles on a collision course coordinate the parameters of their corresponding electromagnetic bumpers to produce a better overall effect (i.e., minimized damage to both vehicles).

Figure 9A:
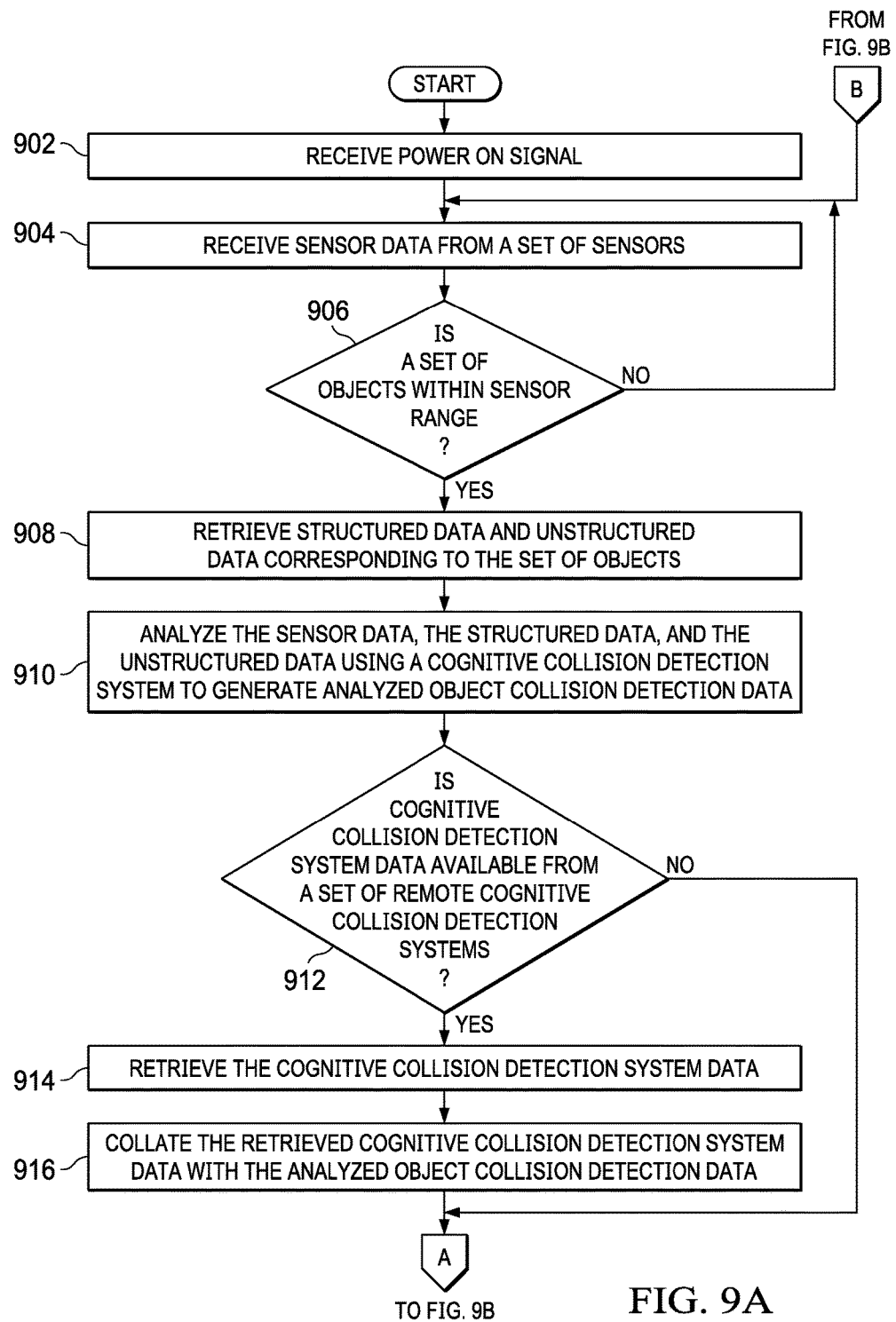
FIGS. 9A-9B are a flowchart illustrating a process for activating a smart bumper system in accordance with an illustrative embodiment.
Figure 9B:
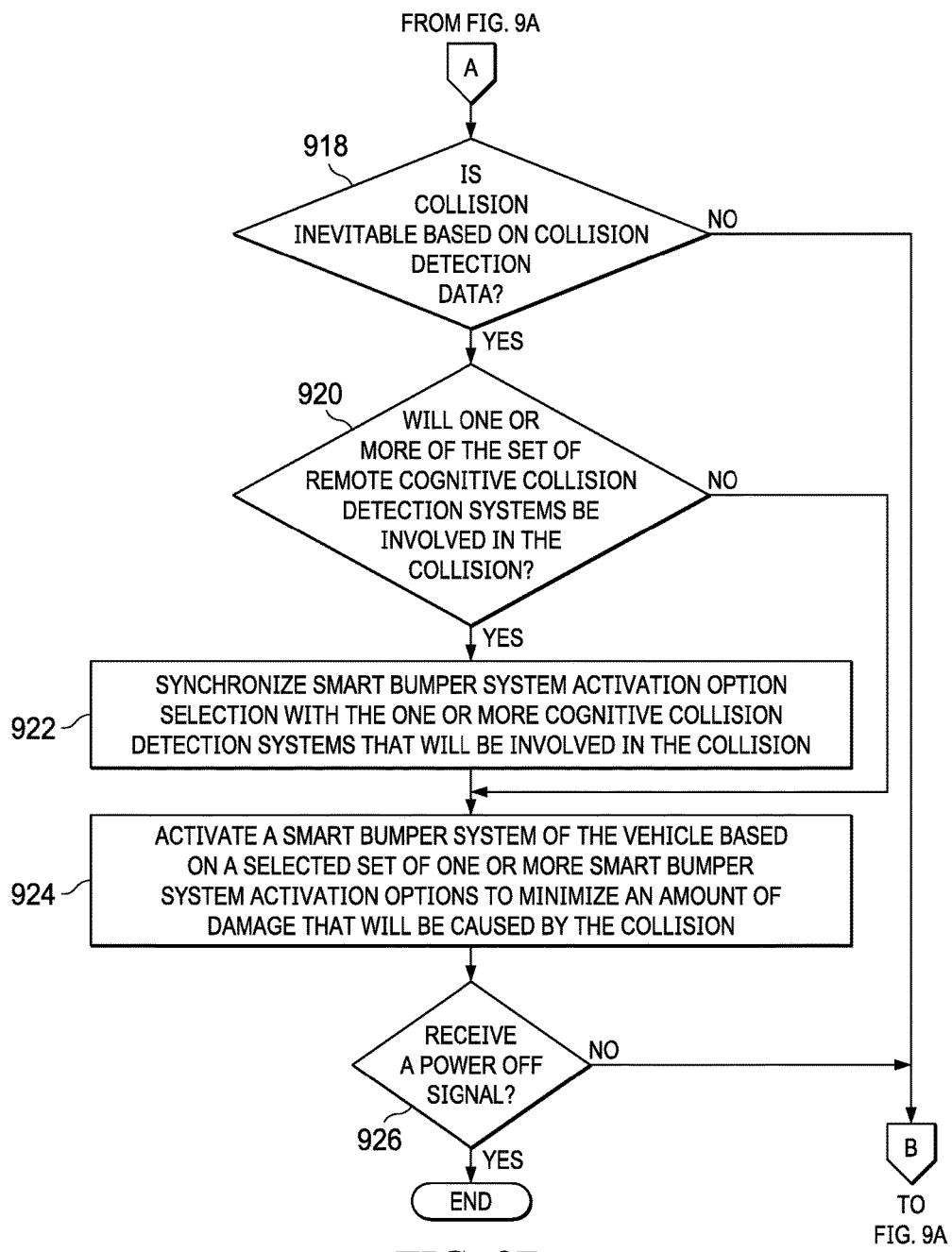

With reference now to FIGS. 9A-9B, a flowchart illustrating a process for activating a smart bumper system is shown in accordance with an illustrative embodiment. The process shown in FIGS. 9A-9B may be implemented in a data processing device, such as, for example, data processing system 116 in FIG. 1 or data processing system 200 in FIG. 2.

The process begins when the data processing system, which is located in a vehicle, such as, for example, vehicle 110 in FIG. 1, receives a power on signal (step 902). Afterward, the data processing system receives sensor data, such as sensor data 222 in FIG. 2, from a set of one or more sensors located on the vehicle (step 904). The set of sensors may be, for example, sensors 120 in FIG. 1.

The data processing system makes a determination as to whether a set of one or more objects is within sensor range of the set of sensors (step 906). The set of objects may include, for example, vehicles, pedestrians, animals, and inanimate objects, such as trees, signs, telephone poles, and the like. If the data processing system determines that no objects are within sensor range of the set of sensors, no output of step 906, then the process returns to step 904 where the data processing system continues to receive sensor data.

If the data processing system determines that a set of one or more objects is within sensor range of the set of sensors, yes output of step 906, then the data processing system retrieves structured data and unstructured data corresponding to the set of objects within sensor range of the set of sensors from a set of one or more data sources (step 908). The structured data may include, for example, speed of vehicles, distance between the vehicle, and weather conditions, such as icy streets. The unstructured data may include, for example, streaming video information or information regarding traffic conditions obtained from a plurality of social navigation application users. The set of data sources may include, for example, cognitive collision detection server 104 and storage 108 in FIG. 1; persistent storage 208 in FIG. 2; and central cognitive collision detection system 308, satellite system 310, information sources 316, social media data sources 318, and mobile cognitive collision detection system 328 in FIG. 3.

The data processing system analyzes the sensor data, the structured data, and the unstructured data corresponding to the set of objects within sensor range of the set of sensors using a cognitive collision detection system of the data processing system to generate analyzed object collision detection data (step 910). The cognitive collision detection system of the data processing system may be, for example, cognitive collision detection system 118 in FIG. 1 or cognitive collision detection system 218 in FIG. 2. The data processing system makes a determination as to whether cognitive collision detection system data are available from a set of one or more remote cognitive collision detection systems via a network (step 912). The network may be, for example, network 102 in FIG. 1.

If the data processing system determines that no cognitive collision detection system data are available from a set of one or more remote cognitive collision detection systems via a network, no output of step 912, then the process proceeds to step 918. If the data processing system determines that cognitive collision detection system data are available from a set of one or more remote cognitive collision detection systems via a network, yes output of step 912, then the data processing system retrieves the cognitive collision detection system data from the set of remote cognitive collision detection systems (step 914). In addition, the data processing system collates the retrieved cognitive collision detection system data with the analyzed object collision detection data to form collated object collision detection data (step 916).

Afterward, the data processing system makes a determination as to whether a collision is inevitable based on collision detection data (step 918). If the data processing system determines that a collision is not inevitable based on the collision detection data, no output of step 918, then the process returns to step 904 where the data processing system continues to receive sensor data. If the data processing system determines that a collision is inevitable based on the collision detection data, yes output of step 918, then the data processing system makes a determination as to whether one or more of the set of remote cognitive collision detection systems will be involved in the collision (step 920).

If the data processing system determines that none of the set of remote cognitive collision detection systems will be involved in the collision, no output of step 920, then the process proceeds to step 924. If the data processing system determines that one or more of the set of remote cognitive collision detection systems will be involved in the collision, yes output of step 920, then the data processing system synchronizes smart bumper system activation option selection with the one or more cognitive collision detection systems that will be involved in the collision (step 922). The smart bumper system activation option selection may include, for example, a retractable bumper option, an electromagnetic bumper option, an external air bag or pneumatic bumper option, or combinations thereof.

The data processing system activates a smart bumper system of the vehicle based on a selected set of one or more smart bumper system activation options to minimize an amount of damage that will be caused by the collision (step 924). The smart bumper system may be, for example, smart bumper system 130 in FIG. 1, smart bumper system 332 in FIG. 3, smart bumper system 508B in FIG. 5, smart bumper system 608B in FIG. 6, or smart bumper system 710 in FIG. 7. The data processing system also makes a determination as to whether the data processing system received a power off signal (step 926). If the data processing system determines that a power off signal was not received, no output of step 926, then the process returns to step 904 where the data processing system continues to receive sensor data. If the data processing system determines that a power off signal was received, yes output of step 926, then the process terminates thereafter.

Figure 10:
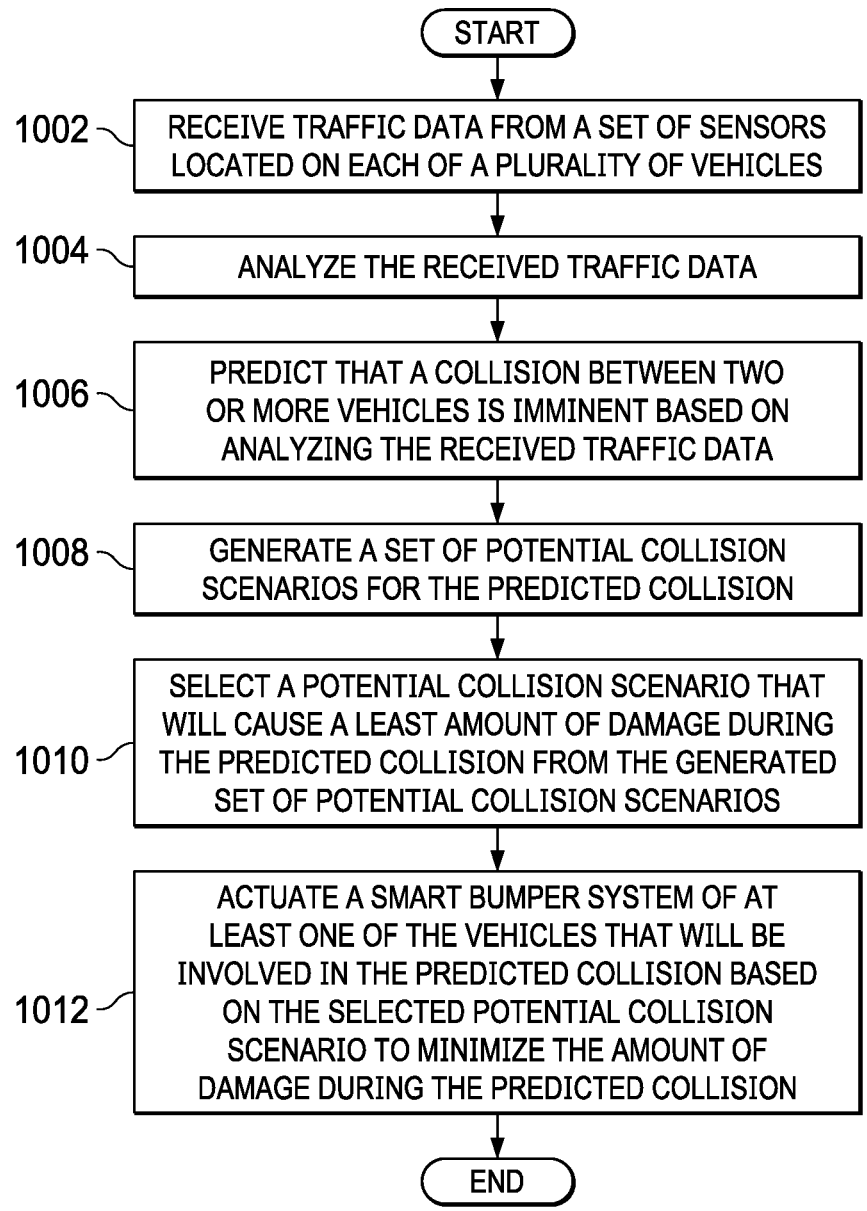
FIG. 10 is a flowchart illustrating a process for minimizing an amount of damage during a collision in accordance with an illustrative embodiment.

With reference now to FIG. 10, a flowchart illustrating a process for minimizing an amount of damage during a collision is shown in accordance with an illustrative embodiment. The process shown in FIG. 10 may be implemented in a cognitive collision detection system of a data processing device, such as, for example, cognitive collision detection system 118 of data processing system 116 in FIG. 1 or cognitive collision detection system 218 of data processing system 200 in FIG. 2.

The process begins when the cognitive collision detection system of the data processing system receives traffic data from a set of one or more sensors located on each of a plurality of vehicles within a defined area (step 1002). The cognitive collision detection system may be located locally in an onboard data processing system of a vehicle or may be located remotely in a server computer. The traffic data may be, for example, traffic data 226 in FIG. 2. The traffic data may include, for example, speed and direction of other vehicles within the defined area and relative location and size of the other vehicles. The set of sensors may be, for example, sensors 120 in FIG. 1. The set of sensors may include, for example, one or more imaging devices, motion detectors, metal detectors, and/or heat detectors. The plurality of vehicles may be, for example, vehicles 110-114 in FIG. 1.

The cognitive collision detection system of the data processing system located in the vehicle analyzes the received traffic data using natural language processing and machine learning (step 1004). The cognitive collision detection system of the data processing system located in the vehicle predicts that a collision between two or more vehicles is imminent based on analyzing the received traffic data (step 1006). The cognitive collision detection system of the data processing system located in the vehicle generates a set of potential collision scenarios for the predicted collision (step 1008).

Afterward, the cognitive collision detection system of the data processing system located in the vehicle selects a potential collision scenario, which will cause a least amount of damage during the predicted collision, from the generated set of potential collision scenarios for the predicted collision (step 1010). The cognitive collision detection system of the data processing system located in the vehicle actuates a smart bumper system of at least one of the two or more vehicles that will be involved in the predicted collision based on the selected potential collision scenario to minimize the amount of damage during the predicted collision (step 1012). The smart bumper system may be, for example, smart bumper system 130 in FIG. 1. Actuating the smart bumper system of at least one of the two or more vehicles includes at least one of: 1) actuating a mechanically adjustable bumper to move with a determined amount of speed and in a determined direction adjusting an impact location between vehicles during the predicted collision; and 2) actuating an electromagnetic bumper in each vehicle to generate electromagnetic waves of opposite polarity to repel each other and reduce an amount of force of an impact between the vehicles during the predicted collision.

Thus, illustrative embodiments of the present invention provide a computer-implemented method, data processing system, and computer program product for minimizing damage caused by a collision using a cognitive collision detection system that controls aspects associated with the collision and vehicular sub-systems, such as a smart bumper system. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for activating a smart bumper system, the computer-implemented method comprising:
    receiving traffic data from a set of sensors located on each of a plurality of vehicles within a defined area;
    predicting that a collision between two or more vehicles is imminent based on analyzing the traffic data; and
    actuating a smart bumper system of at least one of the two or more vehicles that will be involved in the predicted collision to minimize an amount of damage during the predicted collision.

2. The computer-implemented method of claim 1 further comprising:
    analyzing the traffic data using natural language processing and machine learning.

3. The computer-implemented method of claim 1 further comprising:
    generating a set of potential collision scenarios for the predicted collision;
    selecting a potential collision scenario that will cause a least amount of damage during the predicted collision from the set of potential collision scenarios for the predicted collision; and
    actuating the smart bumper system of the at least one of the two or more vehicles that will be involved in the predicted collision based on the selected potential collision scenario that will cause the least amount of damage during the predicted collision.

4. The computer-implemented method of claim 1, wherein the smart bumper system includes a mechanically adjustable bumper, and wherein the actuating of the smart bumper system further comprises:
    causing the mechanically adjustable bumper to move with a desired amount of speed and at a desired angle to adjust an impact location with another vehicle during the predicted collision.

5. The computer-implemented method of claim 1 further comprising:
    receiving sensor data from the set of sensors;
    determining whether a set of objects is within sensor range of the set of sensors based on the sensor data;
    responsive to determining that a set of objects is within sensor range of the set of sensors, retrieving structured data and unstructured data corresponding to the set of objects within sensor range of the set of sensors from a set of data sources; and
    analyzing the sensor data, the structured data, and the unstructured data corresponding to the set of objects within sensor range of the set of sensors using a cognitive collision detection system.

6. The computer-implemented method of claim 5, wherein the set of objects includes at least one of a vehicle, a pedestrian, an animal, and an inanimate object.

7. The computer-implemented method of claim 1 further comprising:
    determining whether cognitive collision detection system data are available from a set of remote cognitive collision detection systems via a network;
    responsive to determining that cognitive collision detection system data are available from a set of remote cognitive collision detection systems, retrieving the cognitive collision detection system data from the set of remote cognitive collision detection systems; and
    collating the cognitive collision detection system data with analyzed object collision detection.

8. The computer-implemented method of claim 7 further comprising:
    determining whether the predicted collision is inevitable based on collision detection data;
    responsive to determining that the predicted collision is inevitable based on the collision detection data, determining whether one or more of the set of remote cognitive collision detection systems will be involved in the predicted collision; and
    responsive to determining that one or more of the set of remote cognitive collision detection systems will be involved in the predicted collision, synchronizing smart bumper system activation option selection with the one or more cognitive collision detection systems that will be involved in the predicted collision.

9. The computer-implemented method of claim 8 further comprising:
    activating the smart bumper system based on the synchronized smart bumper system activation option selection to minimize the amount of damage during the predicted collision.

10. A data processing system for activating a smart bumper system, the data processing system comprising:
    a bus system;
    a storage device connected to the bus system, wherein the storage device stores program instructions; and
    a processor connected to the bus system, wherein the processor executes the program instructions to:
        receive traffic data from a set of sensors located on each of a plurality of vehicles within a defined area;
        predict that a collision between two or more vehicles is imminent based on analyzing the traffic data; and
        actuate a smart bumper system of at least one of the two or more vehicles that will be involved in the predicted collision to minimize an amount of damage during the predicted collision.

11. The data processing system of claim 10, wherein the processor further executes the program instructions to:
    analyze the traffic data using natural language processing and machine learning.

12. The data processing system of claim 10, wherein the processor further executes the program instructions to:
  generate a set of potential collision scenarios for the predicted collision;
  select a potential collision scenario that will cause a least amount of damage during the predicted collision from the set of potential collision scenarios for the predicted collision; and
  actuate the smart bumper system of the at least one of the two or more vehicles that will be involved in the predicted collision based on the selected potential collision scenario that will cause the least amount of damage during the predicted collision.

13. The data processing system of claim 10, wherein the smart bumper system includes a mechanically adjustable bumper, and wherein actuating the smart bumper system further comprises:
  causing the mechanically adjustable bumper to move with a desired amount of speed and at a desired angle to adjust an impact location with another vehicle during the predicted collision.

14. A computer program product for activating a smart bumper system, the computer program product comprising a non-transitory computer readable storage medium having program instructions embodied therewith, the program instructions executable by a data processing system to cause the data processing system to perform a method comprising:
  receiving traffic data from a set of sensors located on each of a plurality of vehicles within a defined area;
  predicting that a collision between two or more vehicles is imminent based on analyzing the traffic data; and
  actuating a smart bumper system of at least one of the two or more vehicles that will be involved in the predicted collision to minimize an amount of damage during the predicted collision.

15. The computer program product of claim 14 further comprising:
  analyzing the traffic data using natural language processing and machine learning.

16. The computer program product of claim 14 further comprising:
  generating a set of potential collision scenarios for the predicted collision;
  selecting a potential collision scenario that will cause a least amount of damage during the predicted collision from the set of potential collision scenarios for the predicted collision; and
  actuating the smart bumper system of the at least one of the two or more vehicles that will be involved in the predicted collision based on the selected potential collision scenario that will cause the least amount of damage during the predicted collision.

17. The computer program product of claim 14, wherein the smart bumper system includes a mechanically adjustable bumper, and wherein the actuating of the smart bumper system further comprises:
  causing the mechanically adjustable bumper to move with a desired amount of speed and at a desired angle to adjust an impact location with another vehicle during the predicted collision.

\* \* \* \* \*